United States Patent [19]

Ishikawa et al.

[11] Patent Number: 5,200,911

[45] Date of Patent: Apr. 6, 1993

[54] APPARATUS FOR DETECTING FAILURE OCCURRING IN CONTROL SYSTEM FOR DRIVING LOAD

[75] Inventors: Yasuki Ishikawa; Yasuhiro Shiraishi, both of Kanagawa, Japan

[73] Assignee: Nissan Motor Company, Limited, Yokohama, Japan

[21] Appl. No.: 525,771

[22] Filed: May 21, 1990

[30] Foreign Application Priority Data

May 19, 1989 [JP] Japan .................................. 1-126129
May 19, 1989 [JP] Japan .................................. 1-126131
May 19, 1989 [JP] Japan .................................. 1-126132

[51] Int. Cl.$^5$ ............................................. G06F 15/00
[52] U.S. Cl. ................................... 364/578; 364/424.05
[58] Field of Search ........... 364/578, 184, 186, 551.01,
364/424.03, 424.05, 158; 280/91, 840, 707;
180/79.1, 140, 141, 142, 143; 318/561, 565, 566

[56] References Cited

U.S. PATENT DOCUMENTS

| | | | |
|---|---|---|---|
| 3,743,828 | 7/1973 | Berger et al. | 364/158 |
| 4,096,425 | 6/1978 | Brown et al. | 364/159 |
| 4,363,105 | 12/1982 | Plassmeier | 364/424.05 |
| 4,698,745 | 10/1987 | Hiroi et al. | 364/158 |
| 4,878,165 | 10/1989 | Gotou et al. | 364/158 |
| 4,893,600 | 1/1990 | Holmes | 364/158 |
| 5,048,627 | 9/1991 | Eguchi et al. | 364/424.05 |
| 5,056,023 | 10/1981 | Abe | 364/424.03 |

FOREIGN PATENT DOCUMENTS

| | | |
|---|---|---|
| 0012064 | 6/1980 | European Pat. Off. . |
| 2158729 | 5/1973 | Fed. Rep. of Germany . |
| 64-63463 | 3/1989 | Japan . |
| 2-18169 | 1/1990 | Japan . |
| 7509461 | 8/1975 | Netherlands . |
| WO82/01264 | 4/1982 | PCT Int'l Appl. . |
| 323882 | 11/1959 | United Kingdom . |

Primary Examiner—Parshotam S. Lall
Assistant Examiner—Ellis B. Ramirez
Attorney, Agent, or Firm—Foley & Lardner

[57] ABSTRACT

A system for detecting failure in a system controlling an inductance load is provided. This system comprises a controller for providing a driving signal to the inductance load to control it, a dither signal generator for adding a dither signal to the driving signal to be provided to the inductance load, a first monitor for monitoring the dither signal included in the driving signal provided by the controller to detect failure in the controller by detecting an absence of the dither signal therein, and a second monitor for monitoring variation in level of the driving signal from the controller to deactivate failure detecting operation of the first monitor in response to variation above a preselected level to prevent the system from mistakenly interpeting transient level fluctuations as a system failure.

30 Claims, 7 Drawing Sheets

APPARATUS FOR DETECTING FAILURE OCCURRING IN CONTROL SYSTEM FOR DRIVING LOAD

BACKGROUND OF THE INVENTION

1. Technical Field

The present invention relates generally to a system for detecting failure occurring in a control system operating an inductance load. More particularly, the invention relates to a failure detecting system applicable to various control systems such as for a four wheel steering system or an active suspension control system.

2. Background Art

A Japanese Patent First Publication No. 2-18169 discloses a rear wheel steering control system for a vehicle which includes an apparatus for detecting failure occurring in a load driving system.

This control system is operable to determine a rear wheel steering target angle based on a front wheel steered angle and vehicle speed so as to obtain an optimal vehicular dynamic characteristic when turning to steer the rear wheels at a phase angle opposite the direction of front wheels or at the same phase as the front wheels by means of a hydraulic actuator which improves traveling stability and steering responsiveness.

Internally, the above-mentioned control system includes a microcomputer for controlling hydraulic pressure to be applied to the hydraulic actuator and a driving circuit for the latter. The microcomputer calculates a necessary rear wheel steering angle. The driving circuit, in turn, provides current corresponding to the calculated rear wheel steering angle to an electromagnetic valve to apply pressurized hydraulic fluid to the actuator for controlling rear wheel steering. In cases where a wire harness connected between the driving circuit and the electromagnetic valve is broken shutting off the driving current applied to the hydraulic actuator or in case of a short circuit, a maximum current is quickly applied to the hydraulic actuator and the system closes a cutoff valve to block the hydraulic fluid flow to the actuator allowing the remaining hydraulic pressure in the actuator to leak gradually through small clearances in the cutoff valve so as to reduce the hydraulic pressure level therein gradually to prevent sudden vehicular attitude change. Thus, to provide a highly safe control system for rear wheel steering two separate failure detection systems are required one for monitoring operation of the microcomputer and one to monitor the actuator driving circuit.

For monitoring the microcomputer, a clock signal generator is provided which generates clock signals to a signal line in which operation of the microcomputer can be monitored. A watchdog timer monitors the clock signals in a signal current output through the signal line to detect failure such as overload of the microcomputer. For monitoring the driving circuit, the system monitors the current value of a linear driving current flowing in the wire harness to detect failure. However, in cases where a short circuit occurs when driving current is flowing through the wire harness or disconnection of the wire harness occurs at a time when no current is present, the system cannot detect the failure. It will be thus appreciated that the time during which the failure can be detected is limited to a specific period. Additionally, since the system requires two separate failure detecting units for each of the microcomputer and the driving circuit, conventional systems such as described become complex and expensive.

Further, a Japanese Patent First Publication No. 64-63463, which is owned commonly by the assignees of this application, discloses another failure detecting system which includes a clock signal generator interposed between a microcomputer and a driving circuit for a rear wheel steering power cylinder to apply a current with a dither signal to the latter. The system monitors the dither signal in the current output from the driving circuit to detect failure in a system controlling a driven load.

However, because the system detects the failure after the signal is output from the microcomputer, it cannot detect failure in the microcomputer.

SUMMARY OF THE INVENTION

It is accordingly one object of the present invention to avoid the disadvantages of the prior art.

It is another object of the invention to provide a system for detecting failure in a control system driving a load.

According to one aspect of the present invention, there is provided a failure detection system which comprises a first means for applying a driving signal on which a dither signal is superimposed, the driving signal driving a control load, a second means for monitoring the dither signal included in the driving signal provided by the first means to detect failure in the first means by an absence of the dither signal in the driving signal, and a third means for monitoring variation in the level of the driving signal from the first means to deactivate a failure detecting operation of the second means in response to variation out of a preselected range.

According to another aspect of the invention, there is provided a fail-safe system which comprises a first means for providing a driving signal to which a dither signal is added to a control load to control operation thereof, a second means for monitoring the dither signal in the driving signal for detecting an absence of the dither signal prior to input to the load to detect failure in the first means by absence of the dither signal in the driving signal and providing a signal indicative thereof, a third means for disabling operation of the control load in response to the signal from the second means, a fourth means for monitoring variation in the level of the driving signal from the first means to detect the first means in a transition state to provide a signal indicative thereof, and a fifth means for deactivating the third means in response to the signal from the fourth means.

According to a further aspect of the invention, there is provided a failure detection system which comprises a load, a microcomputer for controlling the load which includes a driving circuit for providing a driving signal to drive the load, a signal generator for producing a dither signal in response to operation of the microcomputer, and a signal adder for adding the dither signal to the driving signal, a driving control circuit for providing a driving current with the dither signal to the load according to the driving signal to which the dither signal is added, and a detection means for monitoring the dither signal in the driving current prior to input to the load to detect failure in the microcomputer or the driving control circuit by an absence of the dither signal in the driving current.

According to a still further aspect of the invention, there is provided a failure detection system for detecting failure occurring in an automotive rear wheel control system which provides a control signal to a solenoid valve of a power cylinder to steer rear wheels, the failure detection system comprising a first means for superimposing a dither signal on the control signal to be applied to the solenoid valve, a second means for monitoring the dither signal included in the control signal prior to input to the solenoid valve to detect failure in the rear wheel steering control system by an absence of the dither signal in the control signal to provide a signal indicative thereof, and a third means for monitoring variation in the level of the control signal to deactivate a failure detecting operation of the second means in response to variation out of a preselected range.

DESCRIPTION OF THE PREFERRED EMBODIMENT

Figure 1:
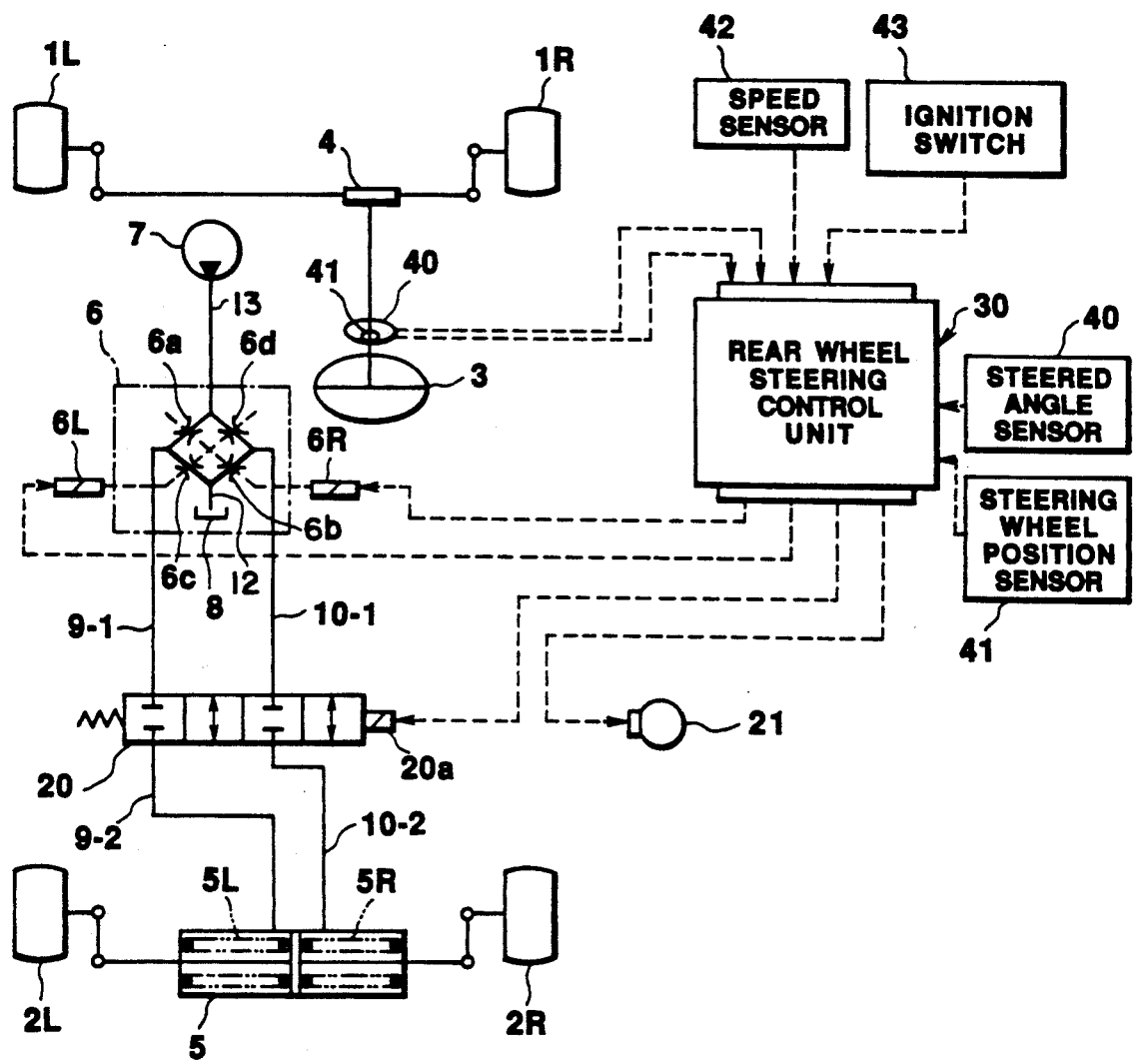
FIG. 1 is a schematic view which shows a four wheel steering control system including a system for detecting failure therein according to the present invention.

Referring now to the drawings, particularly to FIG. 1, a failure detecting system according to the present invention is shown which is incorporated in a four wheel steering (4WS) vehicle including a rear wheel steering control system.

Front wheels 1L (left) and 1R (right) are driven by a steering gear 4 according to rotation of a steering wheel 3. Rear wheels 2L and 2R are driven by a rear wheel steering actuator or a power cylinder 5.

The rear wheel steering power cylinder 5 is a spring-centered type hydraulic cylinder in which two separate chambers 5L and 5R are formed each connected to an electromagnetic proportional pressure control valve 6. Supplying pressurized hydraulic fluid to the chamber 5R causes the rear wheels 2L and 2R to steer respectively to the right at an angle proportional to the pressure of the applied hydraulic fluid, while supplying pressurized hydraulic fluid to the chamber 5L causes the rear wheels to steer to the left respectively at an angle proportional to the pressure of the applied hydraulic fluid.

The electromagnetic proportional pressure control valve 6 is operable to control hydraulic pressure to be applied to the cylinder chambers 5L and 5R and includes a bridge circuit provided with four variable throttle valves 6a, 6b, 6c, and 6d. This bridge circuit communicates with a reservoir tank 8, a hydraulic pump 7, and the power cylinder 5 via fluid lines 12, 13, 9-1, 9-2, 10-1, and 10-2.

The pressure control valve 6 further includes solenoides 6R and 6L which open the variable throttle valves 6a, 6b and 6c, 6d respectively in an OFF state to provide no pressure to the cylinder chambers 5L and 5R, while in an ON state they close the variable throttle valves 6a and 6b or 6c and 6d to a degree corresponding to the magnitude of currents $I_L^*$ or $I_R^*$, which are provided with dither signals as will be described hereinafter, applied thereto to provide hydraulic pressure corresponding to the above signal magnitudes to the cylinder chambers 5L or 5R, steering the rear wheels at an angle corresponding to the hydraulic pressure.

A normally closed type cutoff valve 20 which includes a solenoid 20a is interposed between the pressure control valve 6 and the rear wheel power cylinder 5 through lines 9-1, 9-2, and 10-1, 10-2. The cutoff valve 20 is operable to shut out hydraulic fluid flowing between the lines 9-1 and 9-2 and between lines 10-1 and 10-2 when a solenoid driving current $I_F$ is not present at the solenoid 20a due to an OFF state of an ignition switch or ignition failure, while it allows the hydraulic fluid to flow therethrough when rear wheel steering is in service and the solenoid driving current $I_F$ is present at the solenoid 20a.

The system further includes a rear wheel steering control unit 30, a steered angle sensor 40, a steering wheel neutral position sensor 41, a vehicle speed sensor 42, and an ignition switch 43. These sensors are connected respectively to the control unit 30 to output signals indicative of sensed information thereto. The steering angle sensor 40 senses a steered angle and an angular direction of the steered steering wheel 3 to provide a signal $\theta$ indicative thereof. The steering wheel neutral position sensor 41 senses a neutral position of the steering wheel within a preselected angular range to provide a signal $\theta_c$ indicative thereof. The vehicle speed sensor 42 senses a vehicle speed to provide a signal V indicative thereof. The ignition switch 43 provides a signal to the control unit when being turned on. The control unit 30 is adapted for applying the solenoid driving currents with the dither signals $I_L^*$ or $I_R^*$ to the solenoids 6L or 6R of the pressure control valve 6 and a driving current $I_F$ to the solenoid 20a of the cutoff valve 20 and outputting ON or OFF signals to the alarm lamp 21 based on the signals from the sensors.

Failure of the cutoff valve 20 to close may be caused by overload of the microcomputer, malfunction of sensors, disconnection of a wire, or short circuit in the solenoids 6L or 6R of the pressure control valve 6. If failure occurs, an alarm lamp 21 is turned on and the cutoff valve 20 is closed by the rear wheel steering control unit 30.

Figure 2:
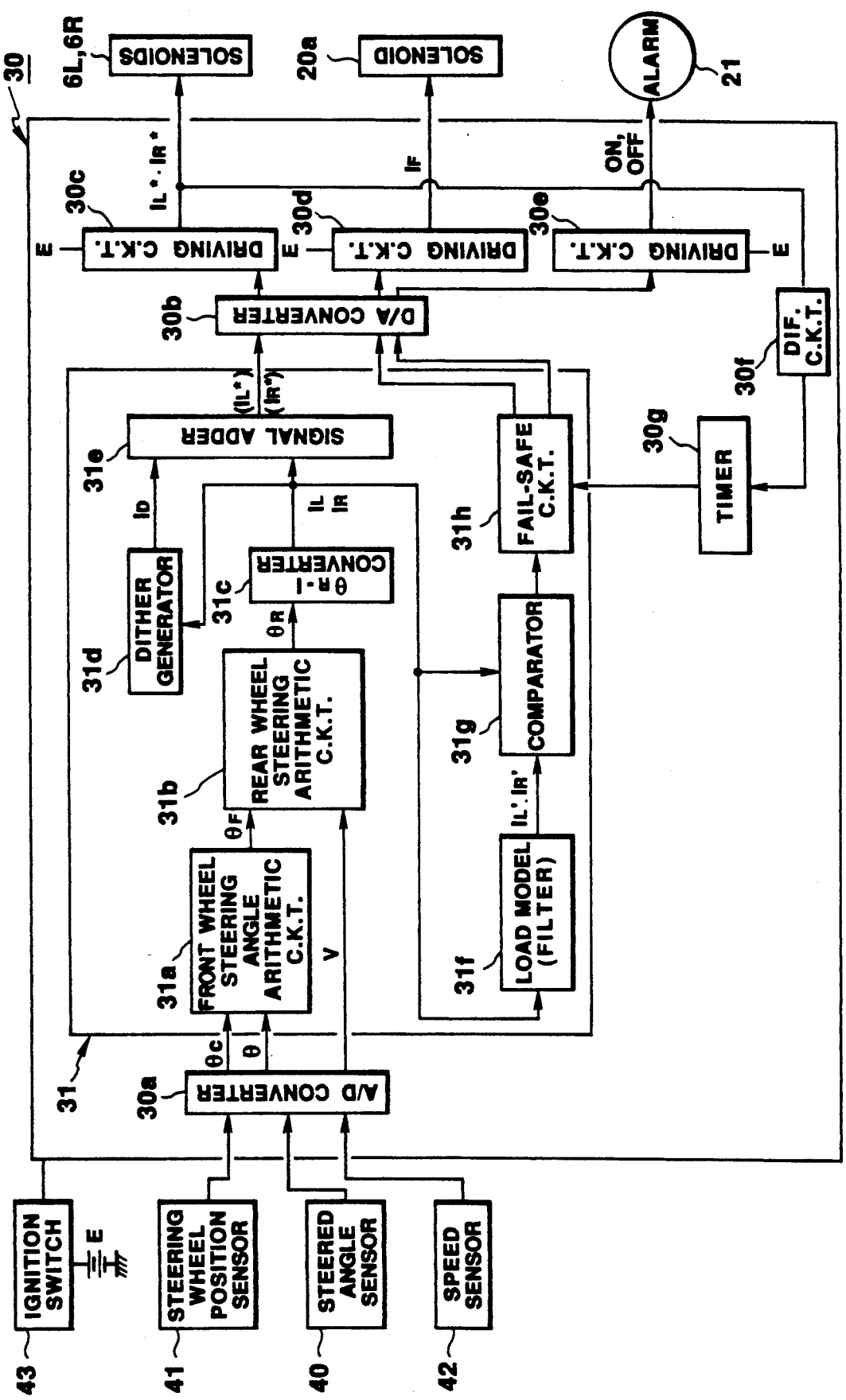
FIG. 2 is a block diagram which shows a rear wheel steering control unit according to the invention.

Referring to FIG. 2, the rear wheel steering control unit 30 according to the invention is shown. This unit 30 includes generally an A/D converter 30a, a digital microcomputer 31, a D/A converter 30b, solenoid drive circuits 30c and 30d, an alarm lamp driving circuit 30e, a differentiating circuit 30f, and a watchdog timer 30g.

The digital microcomputer 31 includes a front steering angle arithmetic circuit 31a, a rear steering angle arithmetic circuit 31b, a $\theta_R$-I converter 31c, a dither signal generator 31d, a signal adder 31e, a load model 31f, a comparator 31g, and a fail safe circuit 31h.

Figure 7:
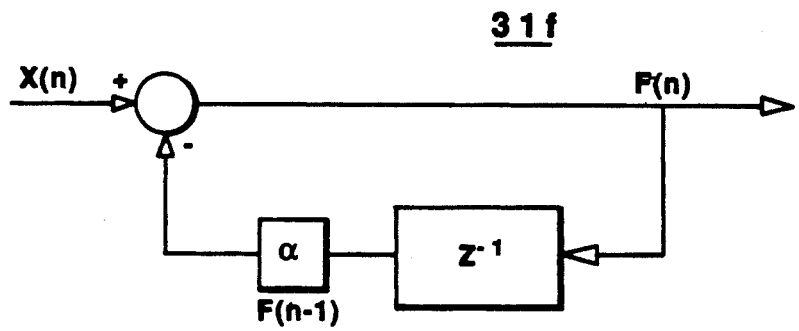
FIG. 7 is a block diagram which shows a load model including a digital filter.

The load model 31f is a linear model indicated as a linear differential equation provided with a digital filter such as an IIR filter (an infinite impulse response filter) as shown in FIG. 7. The load model is adapted for simulating the response of the solenoids 6L and 6R of the pressure control valve 6, to act as an inductance load.

Figure 8:
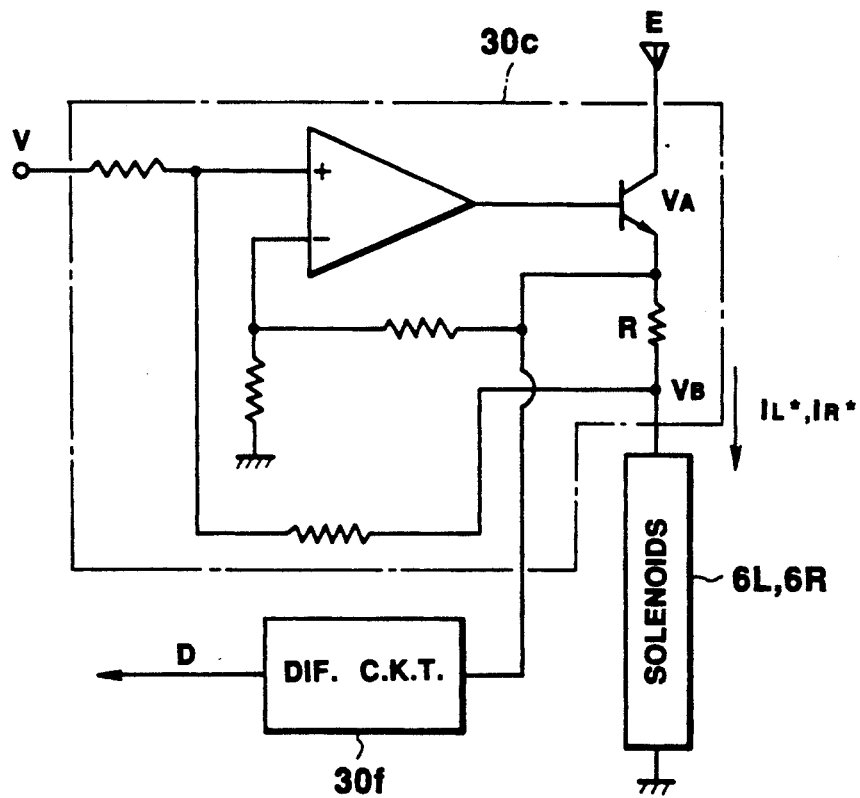
FIG. 8 is a block diagram which shows a driving circuit for solenoids.

The solenoid driving circuit 30c provides the driving currents $I_L^*$ or $I_R^*$, to which the dither signal is added, to the solenoids 6L and 6R of the pressure control valve 6 and includes a constant current circuit, as shown in FIG. 8, using a source voltage E provided by a vehicle battery wherein the driving currents $I_L^*$ or $I_R^*$ are given the relation $(V_A - V_B)/R$.

Figure 3:
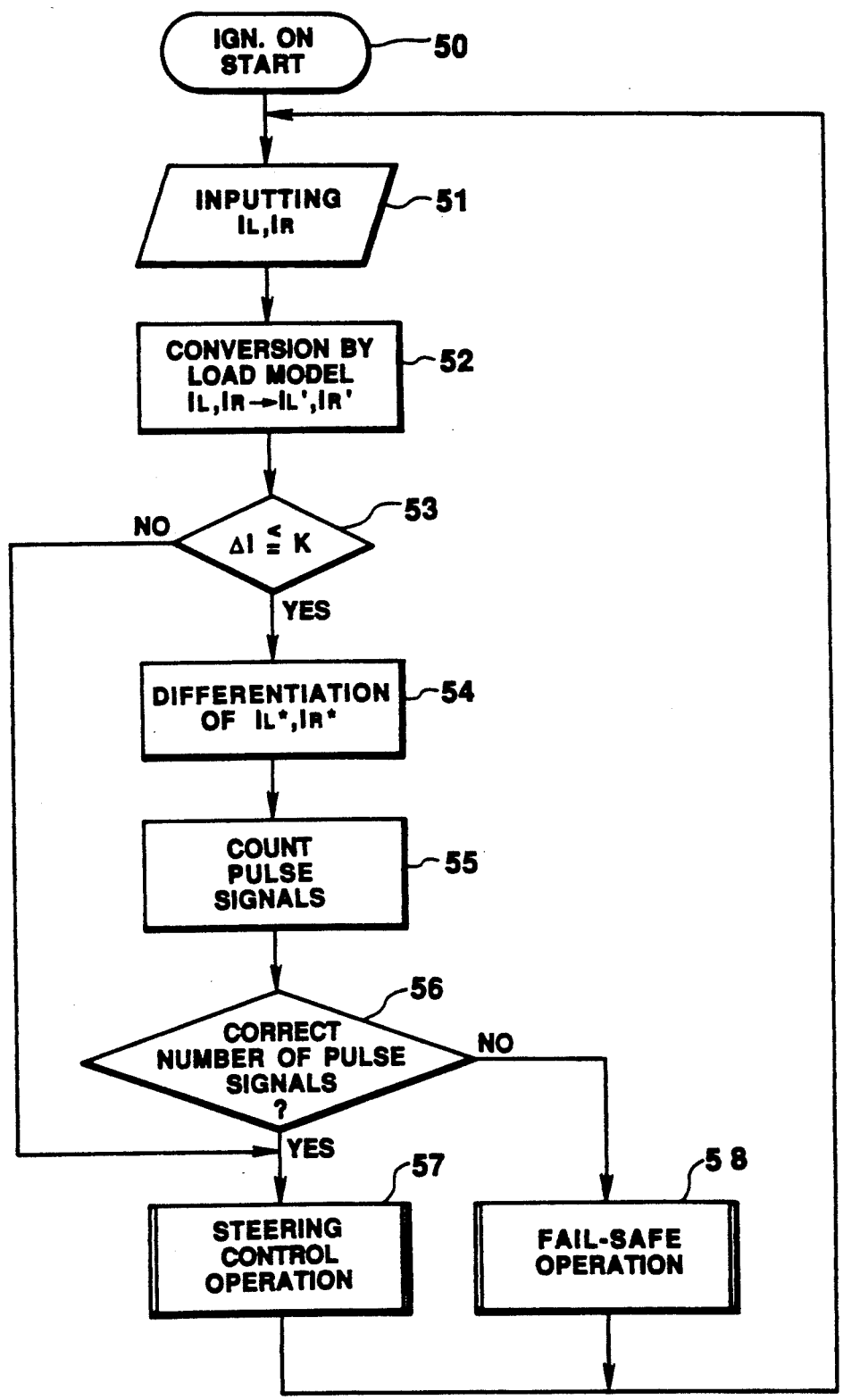
FIGS. 3 and 4 are flowcharts which show a sequence or logical steps carried out by a rear wheel steering control unit.

Referring to FIG. 3, a sequence of logical steps carried out by the control unit 30 for detecting failure in a control system for driving the solenoids 6L and 6R is shown.

With initiation of the program, in step 50 it is determined whether the ignition switch is turned ON or OFF. If a YES answer is obtained, the routine goes to step 51 wherein the driving currents $I_L$ and $I_R$ are input into the load model 31f which simulates the response of the solenoids 6L and 6R of the pressure control valve 6 as an inductance load.

In step 52, the load model 31f converts the input signal currents $I_L$ and $I_R$ into output signal currents $I_L'$ and $I_R'$ by filtering.

In step 53, the comparator 31g determines whether a difference in level $\Delta I$ between the input and output signal currents is less than or equal to a reference level or threshold K. If a NO answer is obtained and there is a transition period with a considerable variation in the input signal current level, the routine proceeds directly to step 57 without carrying out the failure detecting operations in steps 53 to 56. On the other hand, if a YES answer is obtained and there is small variation in the input signal current level, the routine proceeds to steps after step 54 for failure detection. It will be noted that the pressure control valve solenoids 6L and 6R provide the actual load and the driving circuit 30c for the solenoids is a constant current circuit utilizing the constant source voltage E, thus if highly fluctuating current is input to the driving circuit 30c, the flow of the current is restricted due to transient response of the inductance with the result that the constant current circuit is saturated to provide the source voltage E. This means that characteristics as shown in V of FIG. 9 (i.e., voltage characteristics corresponding to the driving signal current with a dither signal $I_L^*$ or $I_R^*$), are present when an input signal current steps up in level extremely, and the source voltage E is, as shown in $V_A$ of FIG. 9, output to the solenoids 6L and 6R in the transient period. Therefore, in a transient period of input to the solenoid driving circuit 30c, the solenoid driving circuit 30c provides, shown as $I_L^*$ ($I_R^*$) in FIG. 9, a driving current without a dither signal and a signal D output from the differentiating circuit 30f behaves as shown in D at the bottom of FIG. 9 wherein pulse signals disappear in an input transient period. As a result, the system may mistakenly determine that a failure has occured.

In order to avoid this error, the load model 31f is provided which simulates a response identical to that of the pressure control valve solenoids 6L and 6R to estimate whether the driving signal current should be applied to the solenoid driving circuit 30c in the transient period or not at a step previous to the actual solenoid driving circuit 30c. If it is estimated that input to the solenoid driving circuit 30c is in a transient period, the operation for detecting the failure is stopped. It will be appreciated that provision of the load model ensures that no dither signal is mistakenly considered as a system failure occurring in the transient period of the input to the solenoid driving circuit and thus ensures highly precise fail-safe operation.

In step 54, the driving currents with dither signals $I_L^*$ and $I_R^*$ applied to the pressure control valve solenoids 6L and 6R are input into the differentiating circuit 30f through a line which branches from a wire harness connecting the solenoid driving circuit 30c and the control valve solenoids 6L and 6R to generate pulse signals corresponding to the dither signals by differentiation.

The routine then proceeds to step 55 wherein the watchdog timer 30g counts the number of pulse signals output from the differentiating circuit 30f, for a preselected constant period of time.

Subsequently, the routine proceeds to step 56 wherein a fail-safe circuit 31h determines whether the number of pulse signals counted by the watchdog timer corresponds to the frequency of the dither signals or not. If a YES answer is obtained, the routine proceeds to step 57 wherein a command signal is produced which allows the rear wheel steering control operation to be carried out. On the other hand, if the number of pulse signals is zero in step 56, the routine proceeds to step 58 wherein a command signal is provided which starts the fail-safe operation as will be described hereinafter.

Disconnection of the wire harness which connects the solenoid driving circuit 30c and the pressure control valve solenoids 6L and 6R causes no driving current to flow in the wire harness, occurrence of a short circuit in the wire harness causes a linear current corresponding to the constant source voltage E to flow to the solenoids 6L and 6R. It will be appreciated that because the dither signals disappear in both of the above cases where failure occurs, detection of the failure due to disconnection of the wire harness or short circuiting thereof is accomplished by monitoring whether the dither signals are present or not in the driving currents with dither signals $I_L^*$ or $I_R^*$ derived from the wire harness connecting to the pressure control valve solenoid 6L and 6R.

Figure 10:
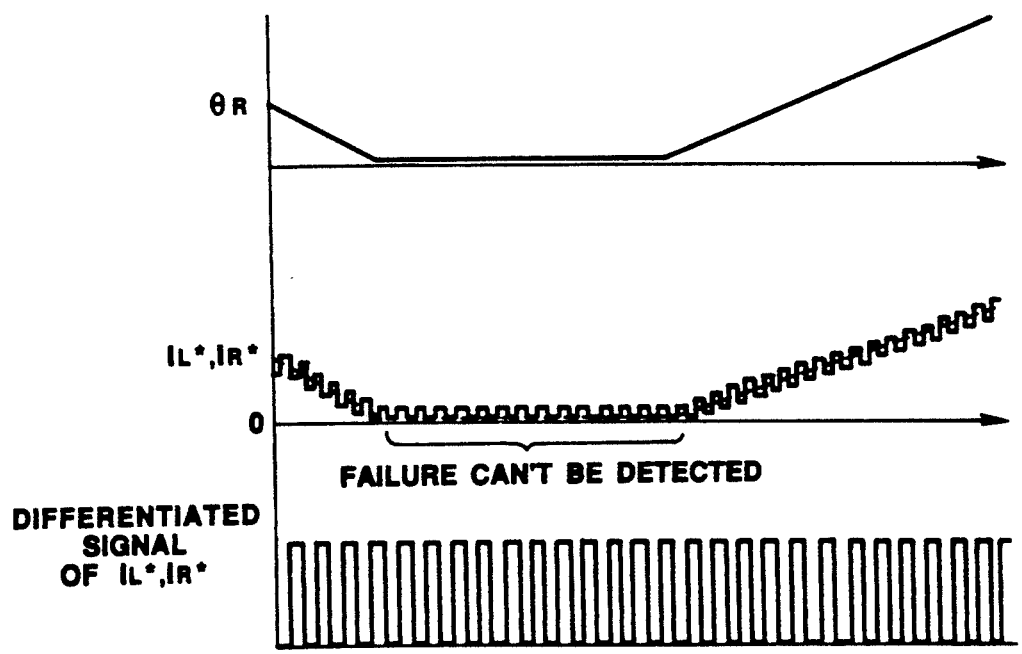
FIG. 10 is a time-chart which shows a relationship between a rear wheel steering target angle, a solenoid driving signal with a dither signal, and a differentiated signal of the solenoid driving signal with the dither signal.

The solenoid driving currents with dither signals $I_L^*$ and $I_R^*$ used for detecting the failure are provided with current on which dither signals are superimposed independent of the current values thereof and thus even when the levels of solenoid driving currents $I_L^*$ or $I_R^*$ are zero, as shown in FIG. 10, the solenoid driving current $I_L^*$ or $I_R^*$ is differentiated to be converted into pulse signals, thus detecting the failure. Therefore, the system according to the present invention is different from a conventional system which monitors a linear driving current to detect the failure. In the present invention the failure in the disconnection of the wire harness when the driving current is zero or a short circuit therein when the driving current flows may be reliably detected without limitation as to a certain period of time in which detecting may occur.

Therefore, compared with conventional systems including many comparators, the system of the present invention is manufactured at low cost and failure of connection or a short circuit is detected with high precision regardless of the presence of a driving current.

Additionally, the system of the present invention includes the digital microcomputer into which the dither current generator 31d is incorporated internally and the solenoid driving circuit 30c which provides the solenoid driving currents with the dither signals $I_L^*$ and $I_R^*$ to be applied to the pressure control valve solenoids 6L and 6R based on the driving current with the dither signal ($I_L^*$ or $I_R^*$) from the microcomputer 31 and is adapted for detecting failure based on presence of the dither signals in the solenoid driving current $I_L^*$ and $I_R^*$ output from the solenoid driving circuit 30c, thus enabling failure in either or both of the microcomputer 31 and the solenoid driving circuit 30c to be detected by a single monitoring circuit provided with the differentiating circuit 30f and the watchdog timer 30g.

It will be appreciated that if failure occurs in the digital microcomputer 31, the dither signal generator 31d provides no dither signal current and thus by monitoring the presence of the dither signal, malfunction of the microcomputer can be detected. Further, if failure occurs in the solenoid driving circuit 30c, it can be detected by recognizing the disappearance of the dither signal from the driving currents $I_L^*$ and $I_R^*$.

As mentioned above, the failure detecting system according to the present invention can detect failure occurring in the solenoid driving system which includes the digital microcomputer 31 and solenoid driving circuit 30c, in addition to detection of disconnection or short circuit of the wire harness.

Figure 4:
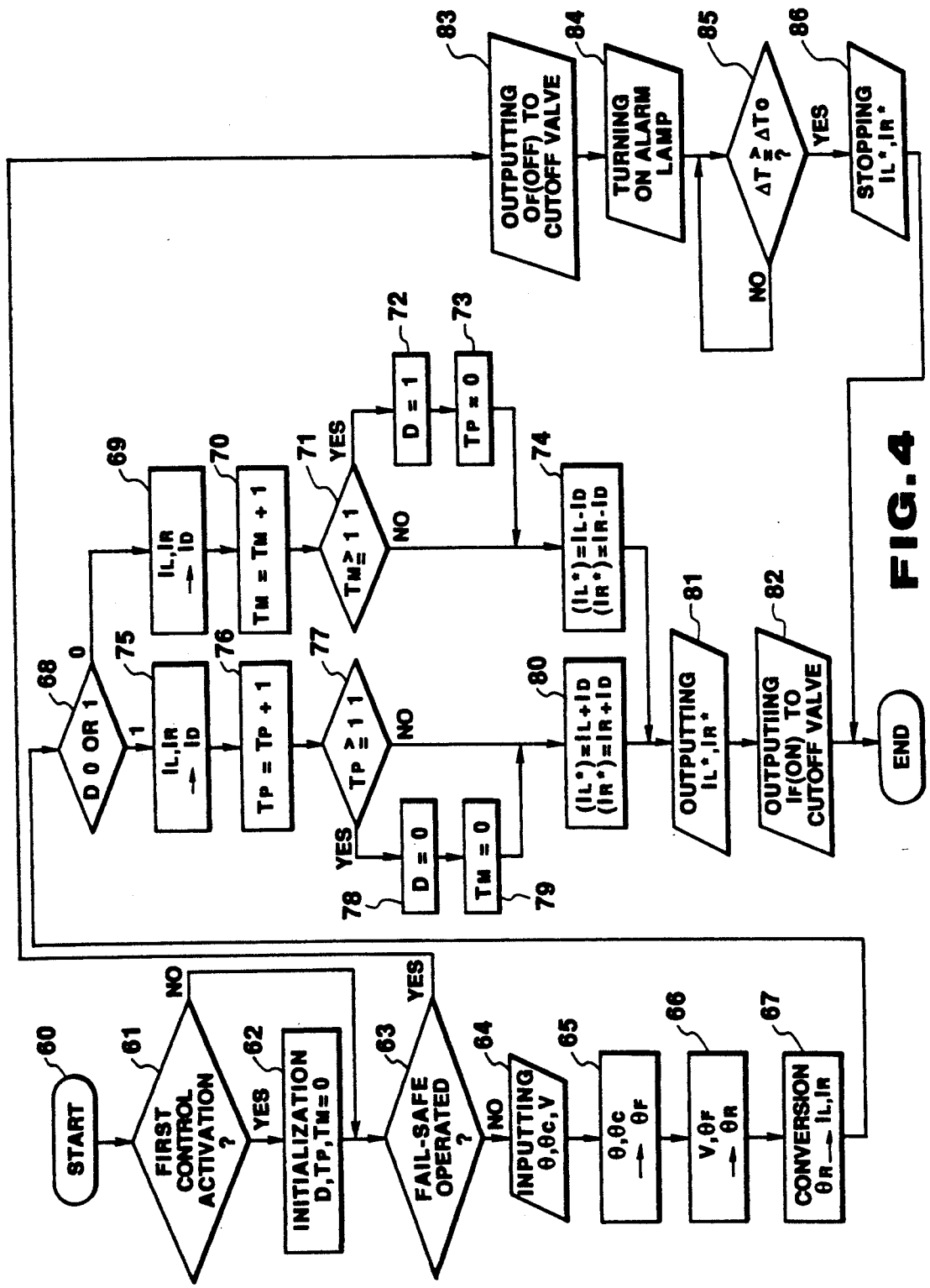

Referring to FIG. 4, a program or sequence of logical steps for rear wheel control and fail-safe operations made in 5 (msec.) cycles is shown.

After initiation of the program in step 60, the routine proceeds to a decision step 61 wherein it is determined as to whether the program operation is a first control activation or not. If a YES answer is obtained in step 61, the routine proceeds to step 62 wherein initialization is made for setting a dither flag D to zero and values $T_p$ and $T_M$ of timers to zero. On the other hand, if a NO answer is obtained in step 61, the routine proceeds directly to step 63.

In step 63, it is determined as to whether the command signal for executing the fail-safe operation which is output in step 58 of FIG. 3 is present or not. If a NO answer is obtained, the routine proceeds to step 64 for carrying out rear wheel steering control. If a YES answer is obtained, the routine proceeds to step 83 for carrying out fail-safe operation.

If no fail safe command is present, at step 64, the rear wheel control unit 30 reads the steering wheel steered angle signal $\theta$, the steering wheel neutral position signal $\theta_c$, and the vehicle speed signal V. The routine then proceeds to step 65 wherein a front wheel steered angle signal $\theta_F$ is calculated, determined by the following equation with respect to a neutral steering angle estimate $\theta_{CM}$ derived from the steered angle signal $\theta$, the steering wheel neutral position signal $\theta_c$ and the steered angle signal $\theta$:

$$\theta_F = |\theta - \theta_{CM}|$$

In step 66, a rear wheel steering target angle $\theta_R$ is mathematically calculated based on the vehicle speed signal V and the front wheel steered angle signal $\theta_F$.

Rear wheel steering angle controls have been disclosed in U.S. patent application Ser. Nos. 407,463 filed on Sep. 7, 1989, 419,161 filed on Oct. 10, 1989, and 483,046 filed on Feb. 21, 1990, entitled "REAR WHEEL STEERING ANGLE CONTROL SYSTEM FOR VEHICLE" and assigned to NISSAN MOTOR CO., LTD, the disclosures of which are incorporated herein by reference.

The routine then proceeds to step 67 wherein the rear wheel steering target angle $\theta_R$ is converted into a driving current signal $I_L$ or $I_R$ according to a pre-provided table relating to $\theta_R - I$ characteristics. The routine proceeds to a decision step 68 wherein it is determined whether a dither flag D is 1 or 0. If the dither flag D is 0, the routine proceeds to steps 69 to 73 wherein a dither signal current $-I_D$ is added. If the dither flag D is 1, the routine proceeds to steps 75 to 80 wherein a dither current signal $+I_D$ is added.

Figure 5:
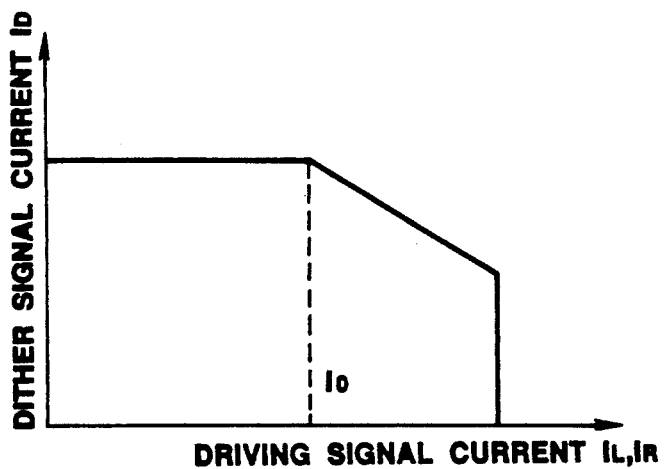
FIG. 5 is a graph which shows a dither signal/driving signal current relationship showing solenoid characteristics.

In step 69, the dither signal generator 31d produces a dither signal current $I_D$ (for example, a 50 mA current) relative to the solenoid driving signal currents $I_L$ or $I_R$ based on the driving signal currents $I_L$ or $I_R$ output from the $\theta_R - I$ converter 31c and the dither signal current characteristic as shown in FIG. 5.

In step 70, one is added to the value $T_M$ of the timer for every program starting. The routine proceeds to a decision step 71 wherein it is determined as to whether the timer value $T_M$ is greater than or equal to eleven. If not, the routine proceeds to step 74 wherein a signal adder 31e calculates the driving signal currents with the dither signals ($I_L^*$) or ($I_R^*$) according to the following equations:

$$(I_L^*) = I_L - I_D$$

$$(I_R^*) = I_R - I_D$$

When the timer value $T_M$ becomes eleven, the routine proceeds to step 72 wherein the dither flag D is set to 0 and then in step 73, the timer value $T_p$ is set to 1.

In step 75, similar to step 68, the dither signal generator 31d provides a signal current with dither signal $I_D$ relative to driving signal currents $I_L$ or $I_R$ output from the $\theta_R - I$ converter 31c and the dither signal characteristic as shown in FIG. 5. The routine then proceeds to step 76 wherein one is added to the value $T_p$ of the timer for every program operation. The routine proceeds to a decision step 77 wherein it is determined whether the value $T_p$ of the timer is greater than or equal to eleven. If not, the routine proceeds to step 80 wherein the signal adder 31e calculates the driving signal currents with the dither signals ($I_L^*$), ($I_R^*$) according to the following equations:

$$(I_L^*) = I_L + I_D$$

$$(I_R^*) = I_R + I_D$$

When the timer value $T_M$ becomes eleven in step 77, the routine proceeds to step 78 wherein the dither flag D is converted into zero and then in step 79, the timer value $T_M$ is converted into zero.

Figure 9:
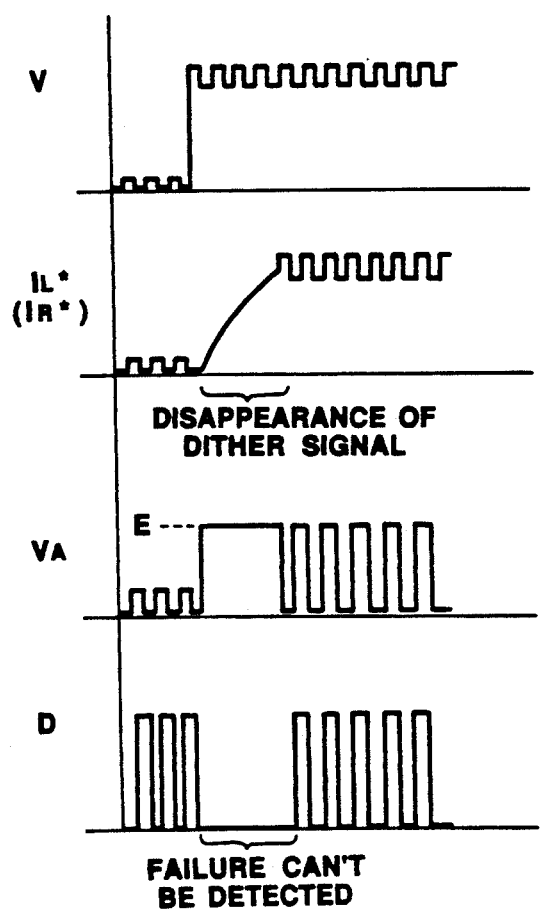
FIG. 9 is a time-chart which shows signal characteristics in a transient period where signals input to a solenoid driving circuit are changed suddenly.

It will be noted when the digital microcomputer is in service, addition of the dither signal currents $-I_D$ or $+I_D$ to the solenoid driving currents $I_L$ or $I_R$ is always repeated for ten operating cycles (i.e., for 50 msec. until the timer value reaches eleven) to obtain a dither signal which has a constant frequency varying for every 50 msec. as shown in FIGS. 9 and 10, for example.

In step 81, the solenoid driving circuit 30c provides the driving signal current with the dither signals $I_L^*$ or $I_R^*$ to the pressure control valve solenoids 6L and 6R. The routine then proceeds to step 82 wherein the solenoid driving circuit 30d outputs the solenoid driving current $I_F$ to the cutoff valve solenoid 20a to open the cutoff valve 20.

Figure 6:
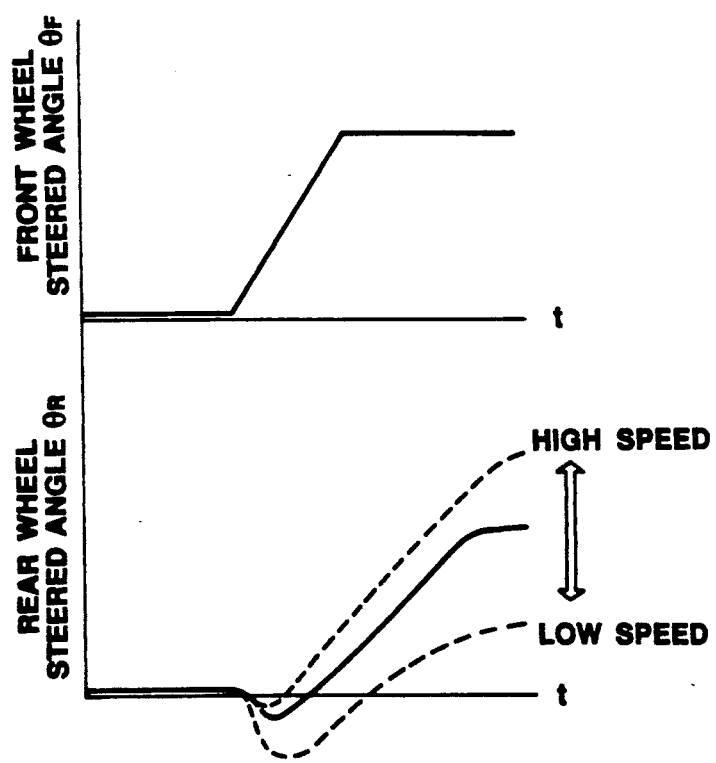
FIG. 6 is a graph which shows a time-chart example of rear wheel steering control.

When rear wheel steering phase inversion control according to a first order lead time as shown in FIG. 6 (i.e., it means that a time in which a steering phase angle is changed is advanced as vehicle speed becomes higher) is carried out wherein the rear wheel is steered momentarily to a phase opposite a steered angle of the front wheels just after the steering wheel is turned by a driver and it is then steered to the same phase as that of the front wheel, generation of a steering force is positively urged in a direction generating a yaw rate to build-up the yaw rate, after sufficient yawing is obtained, the rear wheel is steered in the same angular direction as that of the front wheels to restrict increase in the yaw rate, reducing generation of a lateral slip angle. This results in greatly improved traveling stability to obtain high steering response.

It will be noted that the phase inversion control according to the first order lead time is effective at low and intermediate speeds and, as a time in which the steering phase is inverted is advanced (shortened) as the vehicle speed becomes higher, steering responsiveness is substantially similar to a control which steers the rear wheels at the same phase as the steered angular direction of the front wheels, but with improved handling characteristics.

For the dither signal, a constant frequency varying every 50 msec. is provided. However, an amplitude of the dither signal is dependent upon the magnitude of the driving signal current, as shown in FIG. 5, provided so that the effect of addition of the dither signal is enhanced in a range where the driving current $I_L$ or $I_R$ is less than $I_O$, while it is reduced by decreasing the amplitude thereof gradually in a range where the driving current signal $I_L$ or $I_R$ is greater than the $I_O$. This results in greatly improved hydraulic responsiveness for the smaller driving current and reduction of vibration and/or noise in the valve.

As for controlled hydraulic-pressure driving current characteristics, a driving current hysteresis occurs at a rise in the hydraulic pressure and reduction thereof. This hysteresis makes the hydraulic responsiveness worse. It is therefore necessary to enhance the effect provided by adding a dither signal in a manner to greatly increase the amplitude of the dither signal. However, if the effect of the dither signal is increased over the driving current, the hydraulic responsiveness is improved, while variation in the hydraulic pressure is increased due to the increased effect of the dither signal in the range of the greater current, generating vibration or noise.

The dither signal current is added to the driving current for a plurality of purposes such as detection of the above described failure, improvement of the hydraulic responsiveness, reduction of the vibration and/or noise, and, by constantly providing a minute vibration to a spool of the control valve 6, stick slip is restricted. A dither signal having an amplitude of ±0.1A or less and a frequency of 100 Hz satisfies all the above purposes and does not affect rear wheel steering control utilizing the pressure control valve 6.

In step 83, the solenoid driving circuit 30d provides a driving current $I_F$ to the valve solenoid 20a to close the cutoff valve 20. The routine then proceeds to step 84 wherein the alarm lamp driving circuit 30e provides an ON signal to the alarm lamp 21. Subsequently, the routine proceeds to a decision step 85 wherein it is determined whether a time $\Delta T$ elapsed after provision of the fail-safe command signal equals a preselected time $\Delta T_O$ (for example, 150 msec.) or not. If a YES answer is obtained, the routine proceeds to step 86 wherein a command signal is provided to turn off the driving current with the dither signal $I_L^*$ or $I_R^*$ applied to the solenoids 6L or 6R of the control valve.

Therefore, the fail-safe system controls the cutoff valve 20 so that the hydraulic pressure is blocked and then the hydraulic fluid is allowed to leak through the cutoff valve to return the rear wheels to a neutral position gradually, thereby preventing the orientation or attitude of a running vehicle from changing suddenly during the fail-safe operation.

While the present invention has been disclosed in terms of the preferred embodiment in order to facilitate better understanding thereof, it should be appreciated that the invention can be embodied in various ways without departing from the principles thereof. For example, the failure detecting system according to the present invention may be available as an assist steering control system which controls an actuator to steer front and rear wheels when turning or a control system which drives a preselected inductance load via a driving current such as an active suspension control system, a torque split control system, or an anti-lock brake control system. Further, the failure detecting system may be applicable to various control systems in which a solenoid actuator or a motor actuator is incorporated. Further, while the present system of the invention does not effect failure detecting operation in the transition period of input to the solenoid driving circuit, fail-safe operation may not be disabled. In the above embodiment, the system may maintain the cutoff valve in an open position to allow the rear wheel control system to be operated in the transition period of input to the solenoid driving circuit.

What is claimed is:

1. A failure detection system comprising:
   first means for applying a driving signal on which a dither signal is superimposed, said driving signal driving a control load;
   second means for monitoring said dither signal included in said driving signal provided by said first means to detect failure in said first means by an absence of the dither signal in said driving signal; and
   third means for monitoring variation in the level of said driving signal from said first means to deactivate a failure detecting operation of said second means in response to variation out of a preselected range.

2. A failure detection system comprising:
   first means for applying a driving signal on which a dither signal is superimposed, said driving signal driving a control load;
   second means for monitoring said dither signal included in said driving signal provided by said first means to detect failure in said first means by an absence of the dither signal in said driving signal; and
   third means for monitoring variation in the level of said driving signal from said first means to deactivate a failure detecting operation of said second means, said third means including a load model which simulates the response of said control load and to which the driving signal is input, said third means monitoring a difference in level between the driving signal and an output signal of said load model to deactivate the failure detecting operation when the difference is greater than a reference value.

3. A failure detection system comprising:

first means for applying a driving signal on which a dither signal is superimposed, said driving signal driving a control load;

second means for monitoring said dither signal included in said driving signal provided by said first means to detect failure in said first means by an absence of the dither signal in said driving signal; and third means for monitoring variation in the level of said driving signal from said first means to deactivate a failure detecting operation of said second means, said third means including a load model which simulates the response of said control load and to which the driving signal is input, said third means monitoring a difference in level between the driving signal and an output signal of said load model to deactivate the failure detecting operation when the difference is greater than a reference value, wherein said load model is an infinite impulse response filter.

4. A system as set forth in claim 1, wherein said dither signal has an amplitude and a frequency which does not affect operation of said control load.

5. A system as set forth in claim 1, further comprising a wire harness which connects said control load to said first means for applying said driving signal to said control load, said second means monitoring said dither signal included in said driving signal flowing through said wire harness.

6. A failure detection system comprising:

first means for applying a driving signal on which a dither signal is superimposed, said driving signal driving a control load;

second means for monitoring said dither signal included in said driving signal provided by said first means to detect failure in said first means by an absence of the dither signal in said driving signal;

third means for monitoring variation in the level of said driving signal from said first means to deactivate a failure detecting operation of said second means in response to variation out of a preselected range; and fourth means for deactivating operation of said control load when failure occurs in said first means.

7. A failure detection system comprising:

first means for applying a driving signal on which a dither signal is superimposed, said driving signal driving a control load;

second means for monitoring said dither signal included in said driving signal provided by said first means to detect failure in said first means by an absence of the dither signal in said driving signal; and third means for monitoring variation in the level of said driving signal from said first means to deactivate a failure detecting operation of said second means in response to variation out of a preselected range, wherein said control load is a power cylinder including a solenoid for steering rear wheels of a vehicle.

8. A failure detection system comprising:

first means for applying a driving signal on which a dither signal is superimposed, said driving signal driving a control load;

second means for monitoring said dither signal included in said driving signal provided by said first means to detect failure in said first means by an absence of the dither signal in said driving signal; and third means for monitoring variation in the level of said driving signal from said first means to deactivate a failure detecting operation of said second means in response to variation out of a preselected range, wherein said control load is a power cylinder including a solenoid for steering rear wheels of a vehicle; and fourth means for operating a cutoff valve to block the flow of a working fluid to said power cylinder when failure occurs in said first means.

9. A failure detection system comprising:

first means for applying a driving signal on which a dither signal is superimposed, said driving signal driving a control load;

second means for monitoring said dither signal included in said driving signal provided by said first means to detect failure in said first means by an absence of the dither signal in said driving signal; and third means for monitoring variation in the level of said driving signal from said first means to deactivate a failure detecting operation of said second means in response to variation out of a preselected range, wherein said control load is a power cylinder including a solenoid for steering rear wheels of a vehicle, and wherein an amplitude of said dither signal is set to a first magnitude when said driving signal is equal to or below a preselected level and is set to a second magnitude less than said first magnitude when said driving signal is above said preselected level.

10. A fail-safe system comprising:

first means for providing a driving signal, to which a dither signal is added, to a control load to control operation thereof;

second means for monitoring said dither signal in said driving signal for detecting an absence of said dither signal prior to input to said control load to detect failure in said first means by absence of the dither signal in said driving signal and for providing a failure signal indicative thereof;

third means for disabling operation of said control load in response to the failure signal from said second means;

fourth means for monitoring variation in the level of said driving signal from said first means to detect said first means in a transition state and for providing a transition state signal indicative thereof; and fifth means for deactivating said third means in response to the transition state signal from said fourth means.

11. A system as set forth in claim 10, wherein said fourth means includes a load model which exactly simulates the response of said control load and to which the driving signal is input, said fourth means monitoring a difference in level between the driving signal and an output signal of said load model to deactivate operation of said third means in response to a difference greater than a reference value.

12. A system as set forth in claim 11, wherein said load model is an infinite impulse response filter.

13. A system as set forth in claim 10, wherein said dither signal has an amplitude and a frequency which does not affect operation of said control load.

14. A system as set forth in claim 10, further comprising a wire harness which connects said control load to said first means for applying said driving signal to said control load, said second means monitoring said dither signal included in said driving signal flowing through said wire harness.

15. A system as set forth in claim 10, wherein said control load is a power cylinder including a solenoid for steering rear wheels of a vehicle.

16. A system as set forth in claim 15, wherein said fifth means controls a cutoff valve to block the flow of a working fluid to said power cylinder when failure occurs in said first means.

17. A failure detection system comprising:
a load
a microcomputer for controlling said load, said microcomputer including a driving circuit for providing a driving signal to drive said load, a signal generator for producing a dither signal in response to operation of said microcomputer, and a signal adder for adding said dither signal to said driving signal;
a driving control circuit for providing a driving current with the dither signal to said load according to said driving signal to which the dither signal is added; and
detection means for monitoring said dither signal in said driving current prior to input to said load to detect failure in said microcomputer or said driving control circuit by an absence of the dither signal in said driving current.

18. A failure detection system comprising:
a load
a microcomputer for controlling said load, said microcomputer including a driving circuit for providing a driving signal to drive said load, a signal generator for producing a dither signal in response to operation of said microcomputer, and a signal adder for adding said dither signal to said driving signal;
a driving control circuit for providing a driving current with the dither signal to said load according to said driving signal to which the dither signal is added;
detection means for monitoring said dither signal in said driving current prior to input to said load to detect failure in said microcomputer or said driving control circuit by an absence of the dither signal in said driving current; and
means for monitoring variation in the level of said driving current from said driving control circuit to deactivate a failure detecting operation of said detection means in response to variation out of a preselected range to prevent a failure from being detected mistakenly in a transition period of input of the driving signal to said load.

19. A failure detection system comprising:
a load
a microcomputer for controlling said load, said microcomputer including a driving circuit for providing a driving signal to drive said load, a signal generator for producing a dither signal in response to operation of said microcomputer, and a signal adder for adding said dither signal to said driving signal;
a driving control circuit for providing a driving current with the dither signal to said load according to said driving signal to which the dither signal is added;
detection means for monitoring said dither signal in said driving current prior to input to said load to detect failure in said microcomputer or said driving control circuit by an absence of the dither signal in said driving current; and
means for monitoring variation in the level of said driving current from said driving control circuit to deactivate a failure detecting operation of said detection means in response to variation out of a preselected range to prevent a failure from being detected mistakenly in a transition period of input of the driving signal to said load; and
second means for deactivating operation of said load in response to detection of failure by said detection means.

20. In an automotive rear wheel steering control system which provides a control signal to a solenoid valve of a power cylinder to steer rear wheels, a failure detection system for detecting failure occurring in the rear wheel control system comprising:
first means for superimposing a dither signal on the control signal to be applied to the solenoid valve;
second means for monitoring said dither signal included in said control signal prior to input to the solenoid valve to detect failure in the rear wheel steering control system by an absence of the dither signal in the control signal and for providing a signal indicative thereof; and
third means for monitoring variation in the level of the control signal to deactivate a failure detecting operation of said second means in response to variation out of a preselected range.

21. In an automotive rear wheel steering control system which provides a control signal to a solenoid valve of a power cylinder to steer rear wheels, a failure detection system for detecting failure occurring in the rear wheel control system comprising:
first means for superimposing a dither signal on the control signal to be applied to the solenoid valve;
second means for monitoring said dither signaled included in said control signal prior to input to the solenoid valve to detect failure in the rear wheel steering control system by an absence of the dither signal in the control signal and for providing a signal indicative thereof; and
third means for monitoring variation in the level of the control signal to deactivate a failure detecting operation of said second means, said third means including a load model which simulates the response of the solenoid valve and to which the control signal is input, said third means monitoring a difference in level between the control signal and an output signal of said load model to deactivate the failure detecting operation when the difference is greater than a reference value.

22. In an automotive rear wheel steering control system which provides a control signal to a solenoid valve of a power cylinder to steer rear wheels, a failure detection system for detecting failure occurring in the rear wheel control system comprising:

first means for superimposing a dither signal on the control signal to be applied to the solenoid valve;

second means for monitoring said dither signal included in said control signal prior to input to the solenoid valve to detect failure in the rear wheel steering control system by an absence of the dither signal in the control signal and for providing a signal indicative thereof; and third means for monitoring variation in the level of the control signal to deactivate a failure detecting operation of said second means, said third means including a load model which simulates the response of the solenoid valve and to which the control signal is input, said third means monitoring a difference in level between the control signal and an output signal of said load model to deactivate the failure detecting operation when the difference is greater than a reference value, wherein said load model is an infinite impulse response filter.

23. In an automotive rear wheel steering control system which provides a control signal to a solenoid valve of a power cylinder to steer rear wheels, a failure detection system for detecting failure occurring in the rear wheel control system comprising:

first means for superimposing a dither signal on the control signal to be applied to the solenoid valve;

second means for monitoring said dither signal included in said control signal prior to input to the solenoid valve to detect failure in the rear wheel steering control system by an absence of the dither signal in the control signal and for providing a signal indicative thereof; and third means for monitoring variation in the level of the control signal to deactivate a failure detecting operation of said second means in response to variation out of a preselected range, wherein said dither signal has an amplitude and a frequency which does not affect operation of the solenoid valve.

24. In an automotive rear wheel steering control system which provides a control signal to a solenoid valve of a power cylinder to steer rear wheels, a failure detection system for detecting failure occurring in the rear wheel control system comprising:

first means for superimposing a dither signal on the control signal to be applied to the solenoid valve;

second means for monitoring said dither signal included in said control signal prior to input to the solenoid valve to detect failure in the rear wheel steering control system by an absence of the dither signal in the control signal and for providing a signal indicative thereof; and third means for monitoring variation in the level of the control signal to deactivate a failure detecting operation of said second means in response to variation out of a preselected range; and a wire harness which connects the solenoid valve to the rear wheel steering control system for applying the control signal to the solenoid valve, said second means monitoring said dither signal included in the control signal flowing through said wire harness.

25. In an automotive rear wheel steering control system which provides a control signal to a solenoid valve of a power cylinder to steer rear wheels, a failure detection system for detecting failure occurring in the rear wheel control system comprising:

first means for superimposing a dither signal on the control signal to be applied to the solenoid valve;

second means for monitoring said dither signal included in said control signal prior to input to the solenoid valve to detect failure in the rear wheel steering control system by an absence of the dither signal in the control signal and for providing a signal indicative thereof; and third means for monitoring variation in the level of the control signal to deactivate a failure detecting operation of said second means in response to variation out of a preselected range; and fourth means for deactivating operation of the power cylinder when failure occurs in the rear wheel steering control system.

26. In an automotive rear wheel steering control system which provides a control signal to a solenoid valve of a power cylinder to steer rear wheels, a failure detection system for detecting failure occurring in the rear wheel control system comprising:

first means for superimposing a dither signal on the control signal to be applied to the solenoid valve;

second means for monitoring said dither signal included in said control signal prior to input to the solenoid valve to detect failure in the rear wheel steering control system by an absence of the dither signal in the control signal and for providing a signal indicative thereof;

third means for monitoring variation in the level of the control signal to deactivate a failure detecting operation of said second means in response to variation out of a preselected range; and fourth means for operating a cutoff valve to block the flow of a working fluid to the power cylinder in response to detection of failure by said second means.

27. In an automotive rear wheel steering control system which provides a control signal to a solenoid valve of a power cylinder to steer rear wheels, a failure detection system for detecting failure occurring in the rear wheel control system comprising:

first means for superimposing a dither signal on the control signal to be applied to the solenoid valve;

second means for monitoring said dither signal included in said control signal prior to input to the solenoid valve to detect failure in the rear wheel steering control system by an absence of the dither signal in the control signal and for providing a signal indicative thereof;

third means for monitoring variation in the level of the control signal to deactivate a failure detecting operation of said second means in response to variation out of a preselected range; and fourth means for operating a cutoff valve to block the flow of a working fluid to the power cylinder in response to detection of failure by said second means, wherein said third means monitors variation in the level of the control signal to deactivate said cutoff valve in response to a variation out of a preselected range to allow the working fluid to flow to the power cylinder.

28. A failure detection system comprising:

a load control system including a driving control circuit and a dither signal generator, the driving control circuit providing a driving signal to a control load to control operation thereof, the dither signal generator adding a dither signal to the driving signal supplied to the control load, the dither signal having an amplitude and a frequency which does not affect operation of the control load;

a wire harness for supplying the driving signal with the dither signal to the control load; and failure detection means for detecting the dither signal in the driving signal flowing through said wire harness to determine failure in said load control system by an absence of the dither signal in the driving signal.

29. A system as set forth in claim 28, further comprising signal level detection means for detecting variation in a level of the driving signal to deactivate a failure detecting operation of said failure detection means in response to variation out of a preselected range.

30. A system as set forth in claim 28, further comprising deactivating means for deactivating operation of the control load when failure occurs in said load control system.

* * * * *